United States Patent
Furuhashi

(10) Patent No.: US 10,020,017 B2
(45) Date of Patent: Jul. 10, 2018

(54) HARD DISK DRIVE AND HEAD POSITIONING METHOD

(71) Applicant: Kabushiki Kaisha Toshiba, Minato-ku, Tokyo (JP)

(72) Inventor: Takao Furuhashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 264 days.

(21) Appl. No.: 14/975,366

(22) Filed: Dec. 18, 2015

(65) Prior Publication Data
US 2017/0061997 A1    Mar. 2, 2017

Related U.S. Application Data
(60) Provisional application No. 62/210,613, filed on Aug. 27, 2015.

(51) Int. Cl.
*G11B 19/04* (2006.01)
*G11B 5/596* (2006.01)

(52) U.S. Cl.
CPC ........ *G11B 19/045* (2013.01); *G11B 5/59611* (2013.01); *G11B 5/59627* (2013.01)

(58) Field of Classification Search
CPC ... G11B 5/596–5/59627; G11B 19/04–19/041; G11B 19/045
USPC ...... 360/55, 60, 69, 75, 77.04, 77.06, 78.05, 360/76
See application file for complete search history.

(56) References Cited

U.S. PATENT DOCUMENTS

| | | | |
|---|---|---|---|
| 6,266,205 B1 | 7/2001 | Schreck et al. | |
| 6,381,088 B1 * | 4/2002 | Despain | G11B 5/59605 360/77.06 |
| 6,525,897 B2 * | 2/2003 | Despain | G11B 5/59605 360/77.06 |
| 6,594,103 B1 * | 7/2003 | Despain | G11B 5/59611 360/77.06 |
| 6,747,833 B2 | 6/2004 | Shimokoshi et al. | |
| RE40,413 E * | 7/2008 | Despain | G11B 5/596 360/77.06 |
| 7,489,464 B1 * | 2/2009 | McNab | G11B 5/4826 360/75 |
| 7,502,193 B2 * | 3/2009 | Albrecht | G11B 5/397 360/75 |
| 7,835,106 B2 * | 11/2010 | Miles | G11B 5/59627 360/75 |
| 7,885,025 B2 * | 2/2011 | Eppler | G11B 5/59605 360/77.06 |
| 8,243,382 B2 * | 8/2012 | Miles | G11B 5/455 360/77.08 |
| 8,736,995 B1 | 5/2014 | Wiesen et al. | |

* cited by examiner

*Primary Examiner* — Wayne Young
*Assistant Examiner* — James L Habermehl
(74) *Attorney, Agent, or Firm* — White & Case LLP

(57) ABSTRACT

According to one embodiment, a hard disk drive includes a disk including a plurality of data areas, and a plurality of servo areas between the plurality of data areas, an arm holding a write head and a read arm, and a positioning module which positions the read head or the write head by rotating the arm, wherein the positioning module positioning the write head by positioning the read head, and adjusting a position of the read head or the write head, based on an output of the read head located in a data area between two servo areas adjacent in a peripheral direction, of the plurality of servo areas.

16 Claims, 9 Drawing Sheets

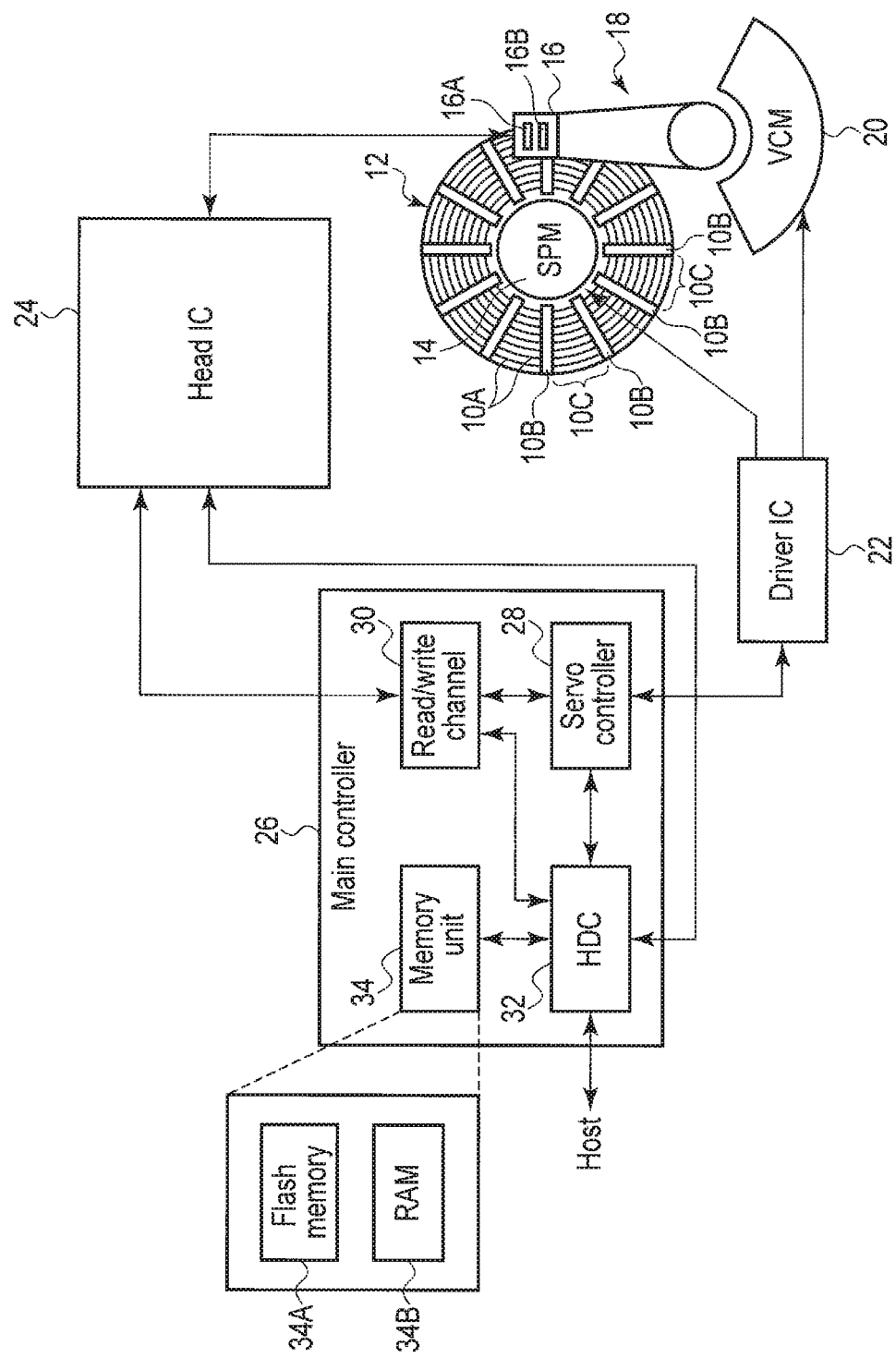
F I G. 1

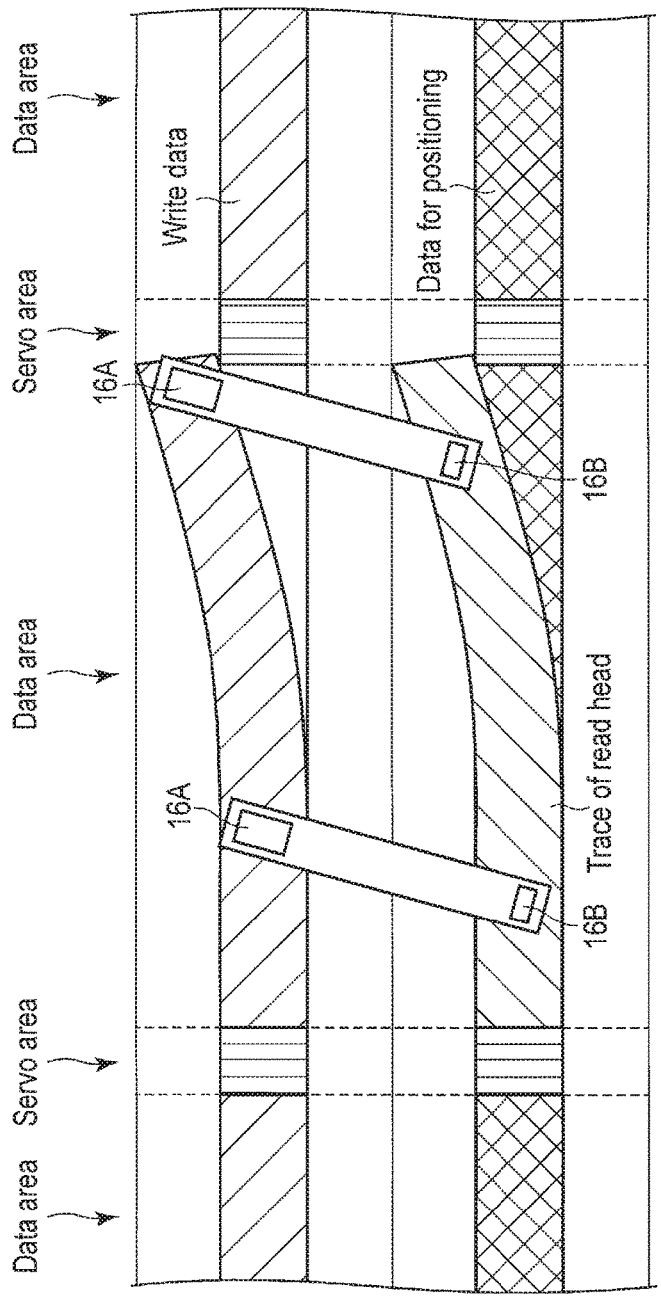
F I G. 6A
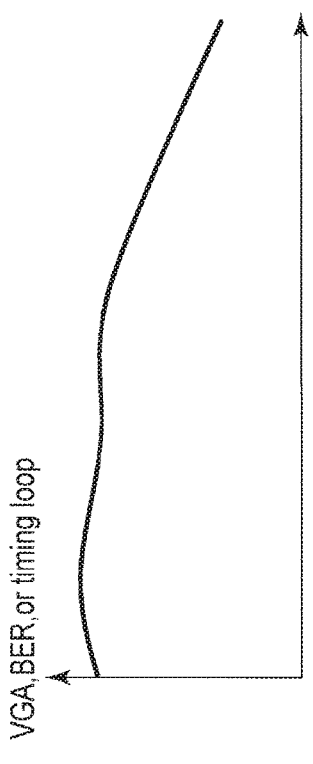
F I G. 6B

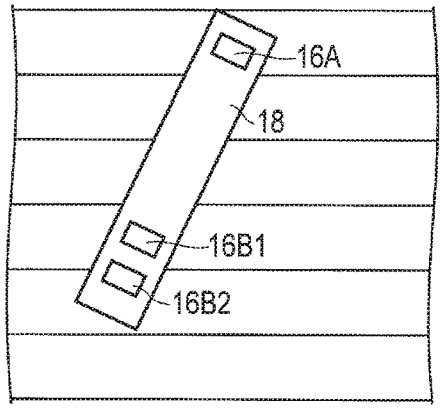
F I G. 8A
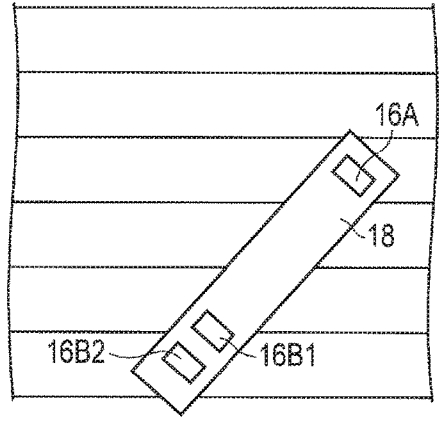
F I G. 8B
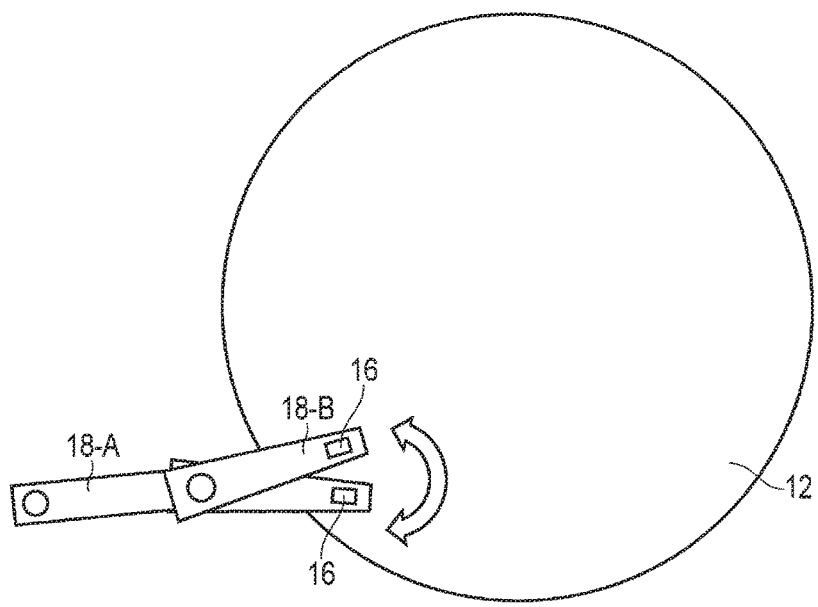
F I G. 9

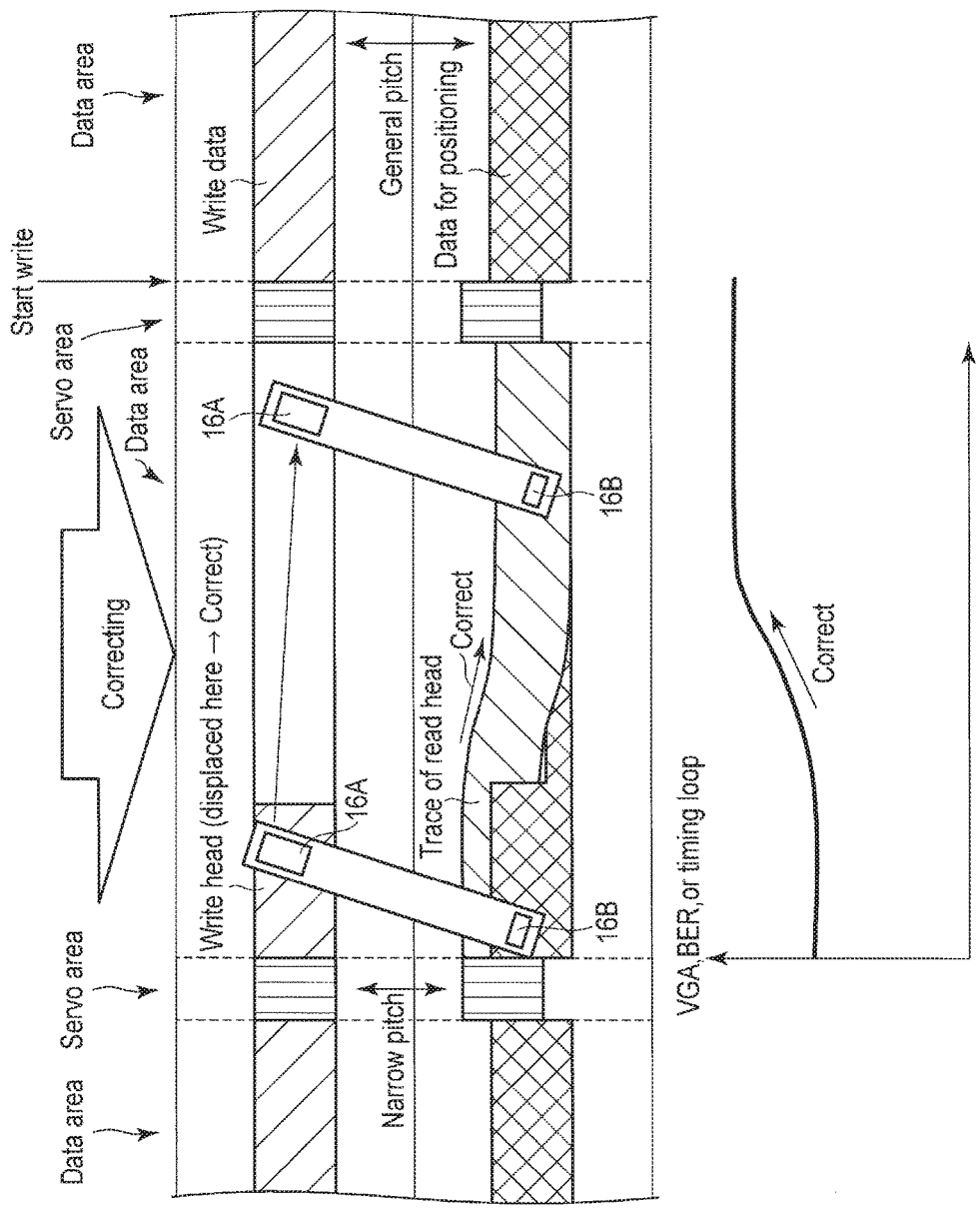
F I G. 10A
F I G. 10B

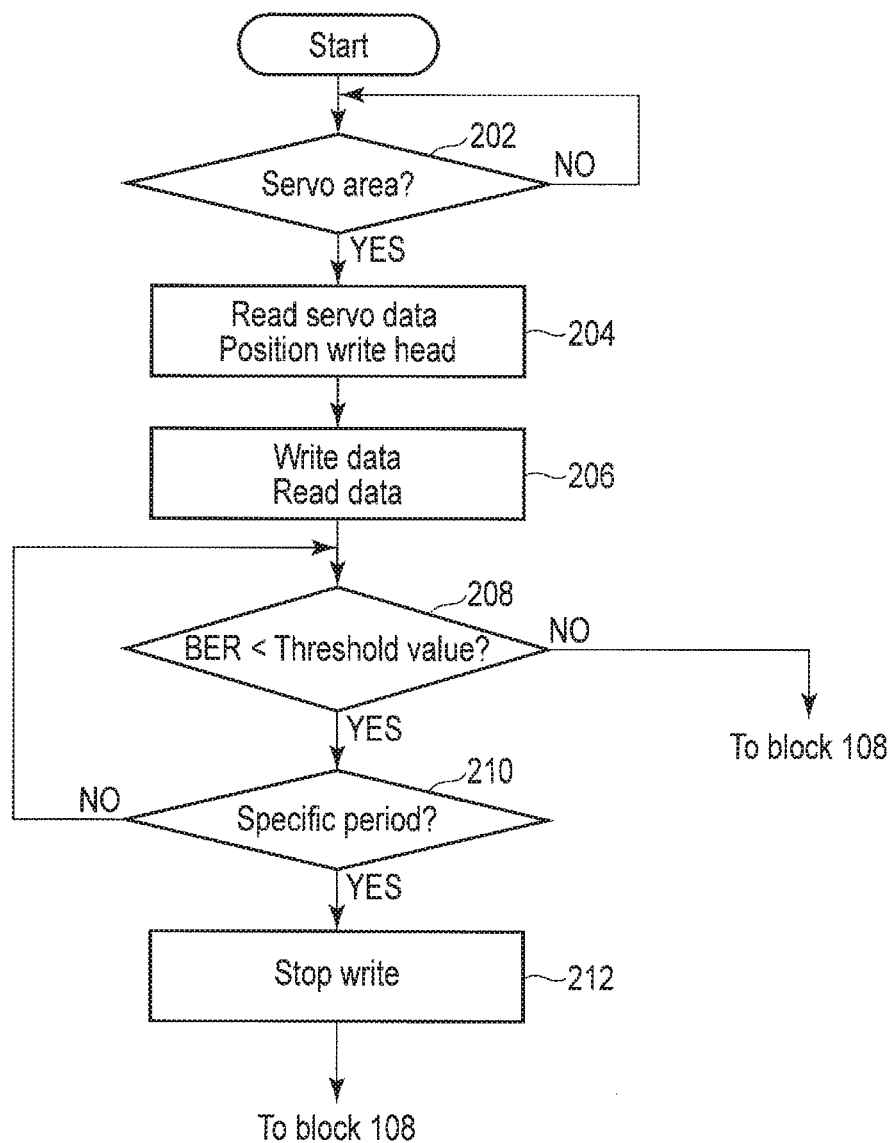
F I G. 11

HARD DISK DRIVE AND HEAD POSITIONING METHOD

CROSS-REFERENCE TO RELATED APPLICATIONS

This application claims the benefit of U.S. Provisional Application No. 62/210,613, filed Aug. 27, 2015, the entire contents of which are incorporated herein by reference.

FIELD

Embodiments described herein relate generally to a hard disk drive and a head positioning method.

BACKGROUND

Increase in recording capacity per unit area, i.e., areal recording density, of a magnetic disk (hereinafter simply called a disk) is required for a hard disk drive. The areal recording density is a product of linear density and track density. The linear density is the recording capacity per unit length along the track direction and is represented by, for example, the number of recording bits per inch, BPI. The track density is the recording capacity per radial unit length and is represented by, for example, the number of tracks per inch, TPI.

Servo data for positioning of a magnetic head (hereinafter simply called a head) at a target position, i.e., a target track on the disk is written on the disk. The servo data is written in servo areas discretely arranged with fixed intervals along a track direction.

For positioning of the head at the target track with high accuracy, based on the servo data, the shape of a center line of the track on which the servo data is written should desirably be a perfect circle. In general, however, the shape of the center line in the track is distorted and is not a perfect circle. The reason is mainly the accuracy in positioning at the time of writing the servo data. The positioning accuracy depends on deflection of the rotation axis of a spindle motor which rotates the disk, the tilt (flutter) component of the disk, deflection caused by airflow disturbance at the rotation, etc. If the shape of the center line in the track is distorted, the servo data includes an error caused by the distortion. Since the error is synchronous with the rotation of the disk, the error is called the repeatable runout (RRO). For this reason, after writing the servo data, RRO correction data for correction of the RRO is written subsequently with the servo data. At the positioning of the head, the servo data is corrected based on the RRO correction data and the head is positioned at the target track in accordance with the corrected servo data.

The servo areas in one track need to be increased in order to increase the positioning accuracy but, as the servo areas are increased, the data areas are reduced, the BPI becomes smaller and the linear density cannot be increased.

The data is not written at one time but is often overwritten on the same portion at several times. In this case, if the track width is small, i.e., if the TPI is great, the positioning accuracy at the writing becomes worsened and, if the head is displaced from the center of track, the data of an adjacent track may be erased by overwriting. The TPI is set at a small value including margin to some extent.

BRIEF DESCRIPTION OF THE DRAWINGS

FIG. 1 is an exemplary block diagram showing a structure of a hard disk drive.

FIG. 6A is an exemplary illustration showing a trace of the head in a case where the head displacement correction is not executed, in the embodiment.

FIG. 6B is an exemplary graph showing variation of the bit error rate, etc., in a tracking state shown in FIG. 6A.

FIG. 8A and FIG. 8B are illustrations showing an arm of an exemplary multi-read head.

FIG. 9 is an illustration showing an exemplary two-stage arm.

FIG. 10A is an exemplary illustration showing a trace of the head in a case where a head displacement correction is executed, in a second embodiment.

FIG. 10B is an exemplary graph showing variation of the bit error rate, etc., in a tracking state shown in FIG. 10A.

FIG. 11 is an exemplary flowchart showing a flow of the head displacement correction at the data write in the second embodiment.

DETAILED DESCRIPTION

Figure 2:
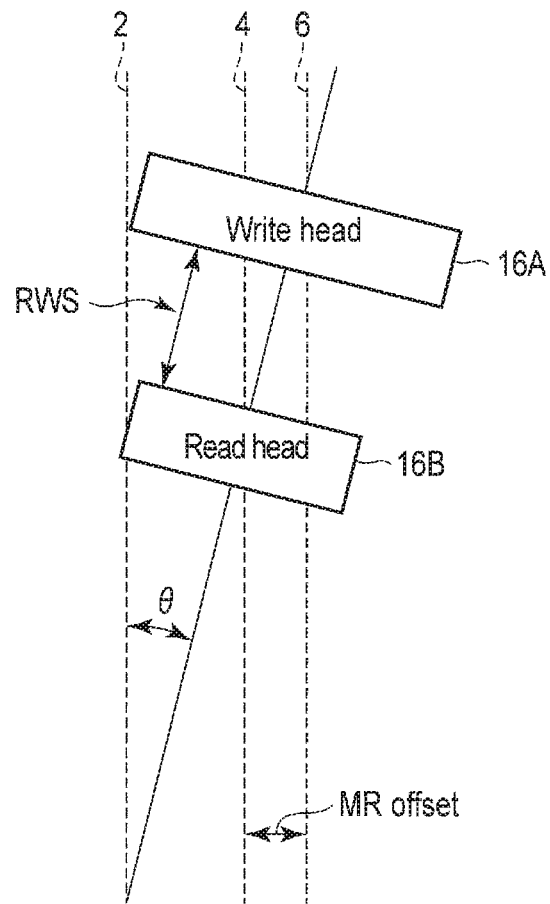
FIG. 2 is an exemplary illustration for explanation of offset between a write head and a read head.

Various embodiments will be described hereinafter with reference to the accompanying drawings.

In general, according to one embodiment, a hard disk drive includes a disk comprising a plurality of data areas, and a plurality of servo areas between the plurality of data areas; an arm holding a write head and a read arm; and a positioning module which positions the read head or the write head by rotating the arm, wherein the positioning module positioning the write head by positioning the read head, and adjusting a position of the read head or the write head, based on an output of the read head located in a data area between two servo areas adjacent in a peripheral direction, of the plurality of servo areas.

FIG. 1 is an exemplary block diagram showing a structure of a hard disk drive.

A disk 12 is rotated at a high speed by a spindle motor 14. The spindle motor 14 is driven by a current (or a voltage) supplied from a driver IC 22. The disk 12 has, for example, a write surface on which data is magnetically recorded, on one of sides thereof.

A head 16 including a write head 16A and a read head 16B is mounted on a distal end of an arm 18 and arranged to face the write surface of the disk 12. The arm 18 is driven by a voice coil motor 20 to move the head 16 in a radial direction of the disk 12 and seek a target position. The voice coil motor 20 is driven by a drive current or a drive voltage from the driver IC 22.

The hard disk drive including the single disk 12 is explained with reference to FIG. 1, but a plurality of disks may be stacked. The disk 12 has the write surface on one of the sides thereof, but write surfaces may be provided on both sides of the disk 12 and a pair of heads 16 may be arranged to face the respective write surfaces.

The write surface of the disk 12 includes for example, a plurality of concentric tracks 10A. One spiral track may be provided instead of the concentric tracks 10A. In the case of the spiral track, the track of each turn is regarded as one track and virtually considered as concentric.

The write surface of the disk 12 includes a plurality of servo areas 10B. The plurality of servo areas 10B are radially formed in a radial direction of the disk 12, and are discretely arranged at regular intervals in a circumferential direction of the disk 12. Data areas 10C are located between adjacent servo areas 10B in each track 10A. The servo area 10B is also called a servo frame. An area formed of the servo area 10B and the data area 10C adjacent to the servo area 10B is also called a servo sector. The data area 100 includes a plurality of data sectors.

Servo data and RRO correction data are written in the servo area 10B. The servo data includes a servo mark, address data and burst data. The servo mark is formed of a specific code (pattern signal) used to identify the servo sector. The address data is formed of an address (i.e., a cylinder address) of the corresponding track 10A and an address (i.e., a servo sector address) of the corresponding servo sector. The burst data is data (i.e., relative position data) used to detect displacement (position error) of the head 16 from, for example, the center line of the corresponding track 10A and is formed of a repeated pattern of a predetermined cycle. Relative positions of the center of the track and the position of the head can be calculated from the amplitude or phase of the burst data. The burst data is written in part in a zigzag shape over two adjacent tracks.

The burst data includes an error caused by distortion of the perfect circle of the track which occurs due to the repeatable runout. Thus, the signal pattern forming the RRO correction data is also written in the area of each servo frame of the track. The RRO correction data is a type of additional data of the servo data.

The driver IC 22 drives the spindle motor 14 and the voice coil motor 20 under control of a servo controller 28 in a main controller 26.

A head IC 24 is also called a head amplifier, and includes a variable gain amplifier (VGA) which amplifies the output signal of the read head 16B (i.e., the read signal) with a gain corresponding to the signal amplitude. An amplitude of an output of the variable gain amplifier becomes substantially constant. The head IC 24 converts write data output from the main controller 26 (more specifically, a read/write channel 30 in the main controller 26) into a write current and outputs the write current to the write head 16A of the head 16.

The main controller 26 is implemented by, for example, a system LSI in which a plurality of elements are integrated on a single chip. The main controller 26 includes a read/write (R/W) channel 30, a hard disk controller (HDC) 32, the servo controller 28, and a memory unit 34. The memory unit 34 includes a flash memory 34A and a RAM 34B. The flash memory 34A is a rewritable semiconductor nonvolatile memory. A control program (firmware) configured to implement functions of the main controller 26 including the HDC 32 and the servo controller 28 is prestored in a part of a storage area in the flash memory 34A. At least a part a storage area of the RAM 34B is used as a work area for the HDC 32 and the servo controller 28. The memory unit 34 may be integrated in a chip different from the chip of the main controller 26.

The read/write channel 30 processes a signal related to read and write operations on the disk 12. For example, the read/write channel 30 converts a read signal from the data area 10C and the servo area 10B, which is amplified by the head IC 24, into digital data, and decodes read data from the digital data. The read/write channel 30 extracts servo data from the digital data. The read/write channel 30 produces a servo sector timing signal, based on the extracted servo data. The servo sector timing signal corresponds to a servo sector including the servo areas 10B in which the extracted servo data is written (more specifically, the data areas 10C in the servo sector including the servo areas 10B). The read/write channel 30 encodes the write data transferred from the HOC 32, and transfers the encoded write data to the head IC 24.

The HDC 32 is connected to a host device (not shown) via a host interface (storage interface). The host device uses the hard disk drive as an own storage. The host device and the hard disk drive are built in an electronic device such as a personal computer, a video camera, a music player, a mobile terminal, a mobile phone or a printer device. The HDC 32 functions as a host interface controller which transfers a signal to the host and receives a signal transferred from the host. More specifically, the HDC 32 receives a command (a write command, a read command, etc.) transferred from the host. The HOC 32 controls data transfer between the host and the HOC 32. The HOC 32 also functions as a disk interface controller which controls writing data to the disk 12 via the read/write channel 30, the head IC 24 and the head 16, and reading data from the disk 12.

The servo controller 28 controls the spindle motor 14 and the voice coil motor 20 via the driver IC 22. For positioning of the head 16 to a target position of the target track 10A on the disk 12, the servo controller 28 controls the voice coil motor 20, based on servo data extracted by the read/write channel 30. Control of the voice coil motor 20 is equivalent to control of the arm 18 including the voice coil motor 20.

Each of the HDC 32 and the servo controller 28 includes a microprocessor unit (MPU) (not shown). The MPUs implement functions of the HOC 32 and the servo controller 28 by executing control programs for the respective HDC 32 and servo controller 28. These control programs are stored in the flash memory 34A. A single MPU may execute the control programs by time division.

MR offset of the head 16 will be explained with reference to FIG. 2. An angle at which a straight line linking a center of the write head 16A and a center of the read head 16B intersects a track 2 of the disk, which is represented by a straight line for convenience of explanation in FIG. 2 but is actually a curve, is called a yaw angle or a skew angle θ (hereinafter called a skew angle). An interval called the read/write separation (RWS) is formed between the read head 16B and the write head 16A, in a length direction of the arm 18. Since the length direction of the arm 18 intersects a radial direction of the disk 12, a trace 6 of the write head 16A on the disk is different from a trace 4 of the read head 16B on the disk, and a displacement represented by MR offset (=RWS×sin θ) is formed between the trace 4 and the trace 6. Since the write head 16A is provided on a distal end side of the arm 18 rather than the read head 16B, the trace 6 of the write head 16A is located on an outer peripheral side than the trace 4 of the read head 16B. For this reason, at the write at a certain track (desired track), the servo data is first read by the read head 16B and then the read head 16B is positioned at a desired track based on the servo data. After that, by driving the arm 18 to rotate by the voice coil motor 20 to move the read head 16B toward the inner peripheral side by MR offset, the write head 16A can be positioned at a desired track. Since the MR offset corresponds to the skew angle θ and the skew angle θ is known in response to the track position (on the inner peripheral side, the central side or the outer peripheral side), the MR offset is also known. After the servo data is read by the read head 16B, the write head 16A may be positioned at the desired track by positioning the read head 16B at a position which is offset from the desired track by MR offset, based on the servo data and the MR offset.

Figure 3:
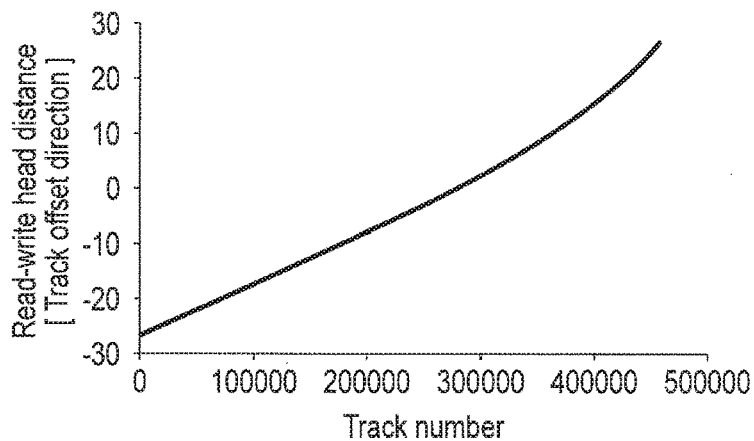
FIG. 3 is an exemplary graph showing a relationship between a track number and, the offset between the write head and the read head.

However, the skew angle θ is varied nonlinearly to the track position. FIG. 3 is a graph showing a relationship between the MR offset and the track position. The vertical axis indicates the MR offset, which is proportional to the skew angle θ. The lateral axis indicates the track number, which is 0 on the innermost periphery and is larger toward the outer periphery. Since the MR offset is thus varied nonlinearly to the track position, a specific track area depending on the skew angle θ can exist in which the MR offset becomes equal to the track interval or an integer multiple of the track interval. In the specific track area, if the trace of the write head 16A corresponds to a center of a certain track, the trace of the read head 16B corresponds to the center of the other track. For this reason, the data which is written at a track previous to one or several tracks can be read by the read head 16B, during the write of the write head 16A. In other words, in the specific track area, data of the track which is the same as the track where the write head 16A is located or data of a track different from the track where the write head 16A is located is present on the track where the read head 16B is located, and the data is readable.

The data can be read even if the read head 16B is slightly displaced from the center of the track. For this reason, the track area where the MR offset is not exactly equal to but substantially equal to the track interval (approximately ±10%) or is not completely equal but substantially equal to a multiple integer of the track interval can also be regarded as the specific track area.

This concept is based on a condition that the read head 16B and the write head 16A correspond to the track center. If, after positioning the read head 16B, accuracy of positioning the write head 16A by rotating the arm and moving the read head 16B toward the inner peripheral side by MR offset is poor, the amplitude of the read signal or the read data value are varied. The displacement amount of the write head from the track center can be obtained from the amplitude of the read signal or the read data value, or these signal processing results. The amplitude of the read signal or the read data value becomes smaller as the read head 16B is displaced from the track center. These signal processing results also include, for example, a bit error rate of the read data, a gain of a variable gain amplifier (VGA) which amplifies the read signal, a frequency tracking characteristic of the read signal, a noise amount to a signal component in the read signal, etc. These signal processing results also vary as the read head 16B is displaced from the track center. Thus, according to the embodiment, displacement of the read head 16B, i.e., the write head 16A, from the track center can be obtained in accordance with the output of the read head 16B located at the written track, during the data write, and the displacement of the write head 16A can be corrected in real time during the write.

Figure 4A:
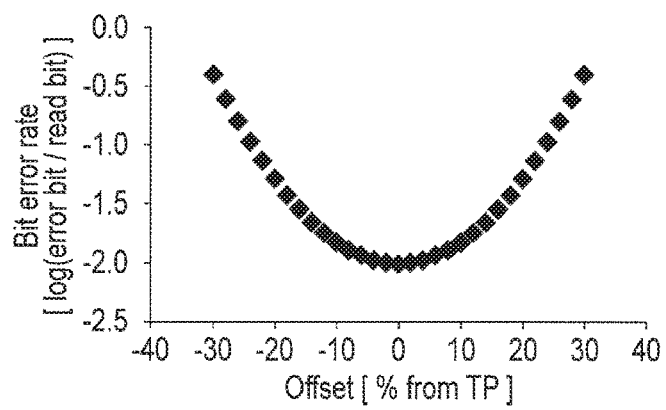
FIG. 4A is an exemplary graph showing a relationship between displacement of the head and a bit error rate.
Figure 4B:
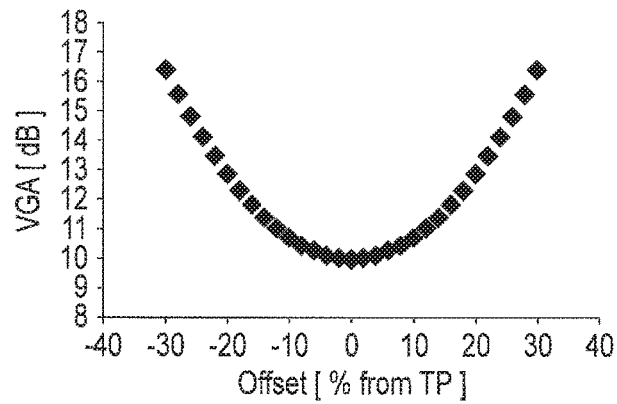
FIG. 4B is an exemplary graph showing a relationship between the displacement of the head and VGA.

The amplitude of the read signal and the read data value are greatest when the read head 16B is located at the track center or substantially at the center, and the amplitude of the read signal and the read data value gradually become smaller as the read head 16B is displaced from the track center. The bit error rate or the gain of the variable gain amplifier (VGA) is smallest when the read head 16B is located at the track center or substantially at the center, and becomes greater as the read head 16B is displaced from the track center. FIG. 4A shows the bit error rate with respect to the displacement of the read head 16B from the track center. FIG. 4B shows the gain of the variable gain amplifier with respect to the displacement of the read head 16B from the track center. In addition, the frequency tracking characteristic, the noise amount to the signal component or the like can also be used as the index of determination of the displacement of the read head 16B. Occurrence of the displacement of the head position indicates the fact that the read head 16B has moved away from or toward the data recording position, and the frequency in the output of the read head 16B appears distorted based on a relative relationship between the data recording position and the head, while the displacement and a relative velocity occur between the read head 16B and the data recording position. Conversely, the displacement can be considered to occur if distortion to the frequency (drift to the measured frequency) is detected. Thus, the positions of the read head 16B and the write head 16A need to be corrected to eliminate the frequency drift. In other words, if the amount of drift from the measured frequency is great, the positions are corrected such that the drift becomes smaller.

The displacement of the write head 16A can be thereby determined during the write and corrected in the specific track area. For this reason, since there is no risk of overwriting and erasing the data in the adjacent tracks during the write of a certain track, the track width can be reduced and the TPI can be partially increased in the specific track area. Alternatively, the number of servo areas in one track can be reduced and the BPI can be partially increased, in the specific track area. The areal recording density can be thereby improved.

Figure 5:
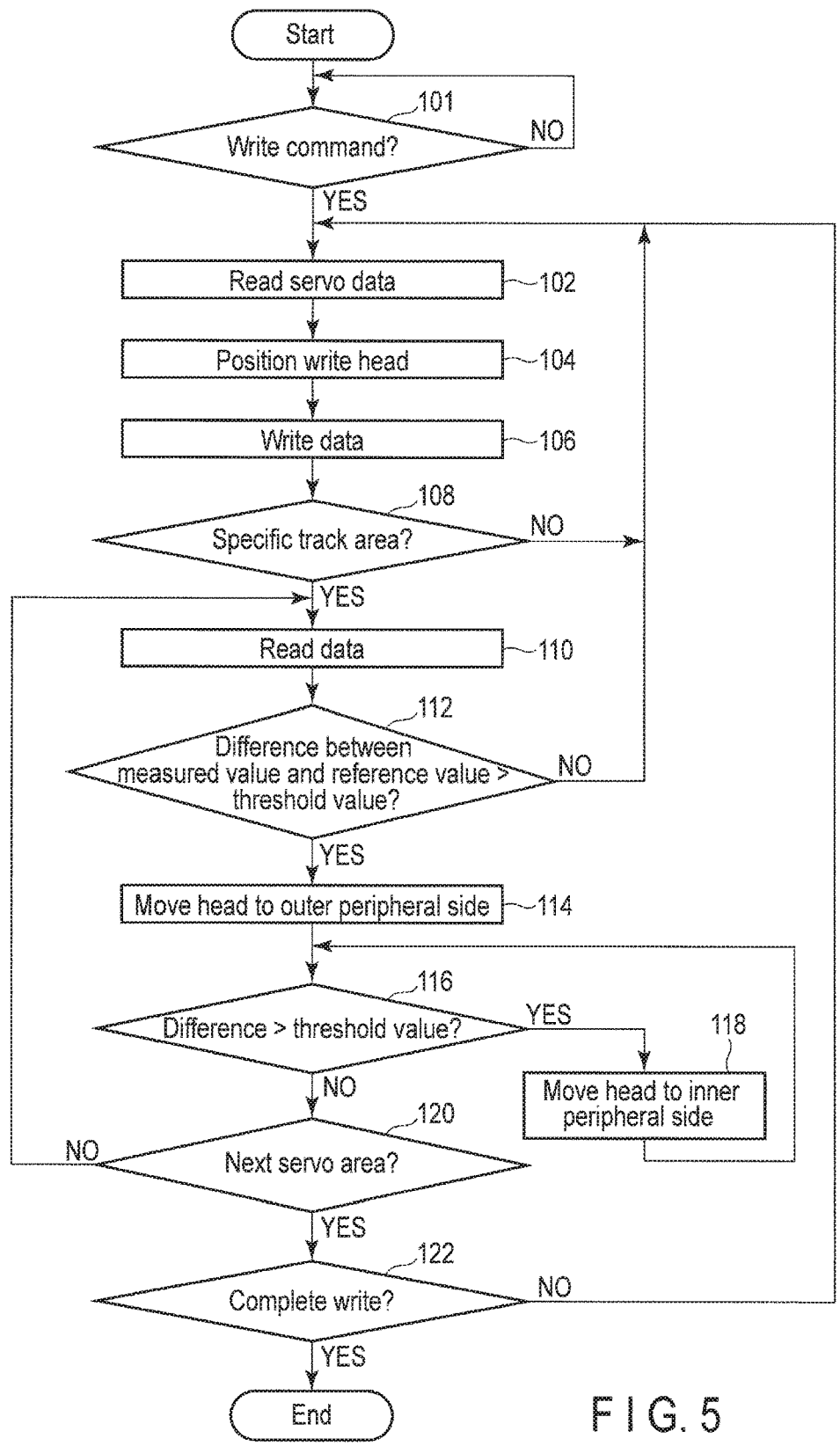
FIG. 5 is an exemplary flowchart showing a flow of the head displacement correction at the data write in a first embodiment.

FIG. 5 is a flowchart showing a flow of servo control at the write controlled by the main controller 26. In block 101, the main controller 26 starts the operation when the main controller 26 receives the write command (including the write address and the write data) from the host device. The main controller 26 may start the operation at the data refresh in which the main controller 26 voluntarily executes the write operation, without receiving the command from the host device. In block 102, the servo controller 28 reads the data in the servo area 10B. In block 104, the servo controller 28 drives the arm 18 to rotate by the driver IC 22 and the voice coil motor 20 and positions the write head 16A at a target track, in accordance with the servo data. More specifically, the servo controller 28 first positions the read 16B at a target track, then moves the arm 18 toward the inner peripheral side by MR offset, and positions the write head 16A at a target track. In block 104, the servo controller 28 may position the write head 16A at a desired track, by positioning the read head 16B at the position which is offset from the desired track by MR offset, based on the servo data and the MR offset. In block 106, the read/write channel 30 starts writing the data to the data area of the target track.

In block 108, the main controller 26 determines whether the target track is located in the specific track area where the MR offset is substantially equal to the track interval or a multiple integer of the track interval or not. If the target track is not located in the specific track area, the processing following block 102 is repeated since the displacement correction of the present embodiment cannot be executed.

If the target track is located in the specific track area, the read head 16B follows a track adjacent to the track corresponding to the trace of the write head 16A or a center of a track remote from the track by several tracks. For this reason, the displacement correction of the present embodiment can be executed. In block 110, the read/write channel 30 reads the data in the data area 10C of the track adjacent to the written track or the track remote by several tracks. The data is assumed to have been written at the adjacent track or the track remote by several tracks, in the current write operation or previous write operation.

In block 112, the main controller 26 determines whether the write head 16A is displaced or not, based on the output of the read head 16B or the signal processing result. The index of determination may be the bit error rate of the read data shown in FIG. 4A or the gain of the VGA shown in FIG. 4B which amplifies the read signal. Furthermore, the frequency tracking characteristic, the noise amount to the signal component or the like may be used as the index of determination. The index characteristics (FIG. 4A, FIG. 4B, etc.) are preliminarily measured and stored in the flash memory 34A. The index characteristics do not need to be measured for each drive, but the characteristics measured in the other drive may be used for the same type of drives. Moreover, not the measured characteristics, but theoretically calculated characteristics may be used. More specifically, it is determined in block 112 whether a difference between an index value (called a reference value) obtained by assuming that the head is at the track center as stored in the flash memory 34A and an index value (called a measured value) calculated based on the actual output of the read head 16B is greater than or equal to a threshold value or not.

If the difference is not greater than or equal to the threshold value, the processing following block 102 is repeated since it is determined that the read head 16B and the write head 16A are substantially located at the track center and are not displaced.

If the difference is greater than or equal to a threshold value, it is determined that the read head 16B and the write head 16A are displaced from the track center, but it cannot be determined at this stage to which side (outer peripheral side or inner peripheral side) the read head 16B and the write head 16A are displaced. For this reason, in block 114, the arm 18 is slightly rotated toward one of the sides (outer peripheral side or inner peripheral side from the track center; the outer peripheral side in this case), and the heads 16A and 16B are slightly displaced to the outer peripheral side. The direction of the displacement can be determined in accordance with the state of variation of the measured value of the index based on the output of the read head 16B. For example, if the index is improved by displacing the heads 16A and 16B to the outer peripheral side, the heads are considered to be displaced to the inner peripheral side at the timing of block 110. Conversely, if the index is not improved by displacing the heads 16A and 16B to the outer peripheral side, the heads are considered to be displaced to the outer peripheral side at the timing of block 110.

For this reason, it is determined again in block 116 whether the difference between the reference value of the index stored in the flash memory 34A and the measured value of the index based on the output of the read head 16B is greater than or equal to the threshold value or not.

If the difference is not greater than or equal to the threshold value, the processing shifts to block 120 since it is determined that displacement of the heads on the inner peripheral side is corrected by moving the heads 16A and 16B to the outer peripheral side and that, currently, the heads are substantially located at the track center and are not displaced.

If the difference is greater than or equal to a threshold value, the arm 18 is slightly rotated to the inner peripheral side in block 118, the heads 16A and 16B are slightly displaced to the inner peripheral side and determination of block 116 is repeated since it is determined that the heads displaced to the outer peripheral side are further displaced to the outer peripheral side. Finally, the difference becomes less than the threshold value and the processing shifts to block 120.

The heads are moved to the inner peripheral side or the outer peripheral side by trial and error and the difference between the reference value and the measured value is compared with the threshold value to examine the direction of displacement of the heads but the direction of displacement of the heads may be determined based on whether the difference between the reference value and the measured value becomes smaller or greater when the heads are moved to the inner peripheral side or the outer peripheral side.

Thus, since the displacement of the heads can be detected and corrected based on the output of the read head 16B which reads the data read during the write, the track interval can be reduced and the TPI can be partially increased, in the specific track area. Alternatively, the number of servo areas in one track can be reduced and the BPI can be partially increased, in the specific track area. The areal recording density can be thereby improved.

In block 120, the main controller 26 determines whether the read head 160 reaches a next servo area 10B or not. If the read head 160 does not reach a next servo area 10B, the processing following block 110 is repeated, the displacement of the head is determined based on the output of the read head 160 while executing the data write, and the data is written while correcting the displacement.

If the read head 16B reaches a next servo area 10B, it is determined in block 122 whether the main controller 26 completes write of all the write data relating to the write command or not. If the main controller 26 does not complete write of all the write data, the processing following block 102 is repeated. If the main controller 26 completes write of all the write data, the processing is ended.

FIG. 6A shows traces of the heads 16A and 16B in a case where the head displacement correction of the present embodiment is not executed. When the heads 16A and 16B are located at the track center in the servo area and then the heads 16A and 16B start being displaced from the track center during the data write, the index such as the VGA, bit error rate, or timing loop is reduced in accordance with the increase in head displacement amount, as shown in FIG. 6B. The read/write channel 30 includes a timing loop circuit (not shown), and checks deviation of the timing by monitoring sampling data obtained after analog-to-digital conversion of the read signal. If the frequency drift occurs, the frequency tracking characteristic is varied by executing the feedback correction to correct the drift. If the frequency drifts obtained before and after the feedback are compared by monitoring the variation in the frequency tracking characteristic, the amount of frequency drift can be detected. The displacement of the heads 16A and 16B is not corrected in the data area 10C but increased together with the movement of the heads 16A and 16B, and the heads 16A and 16B return to the track center by reading the servo data in a next servo area 10B.

Figures 7A, 7B:
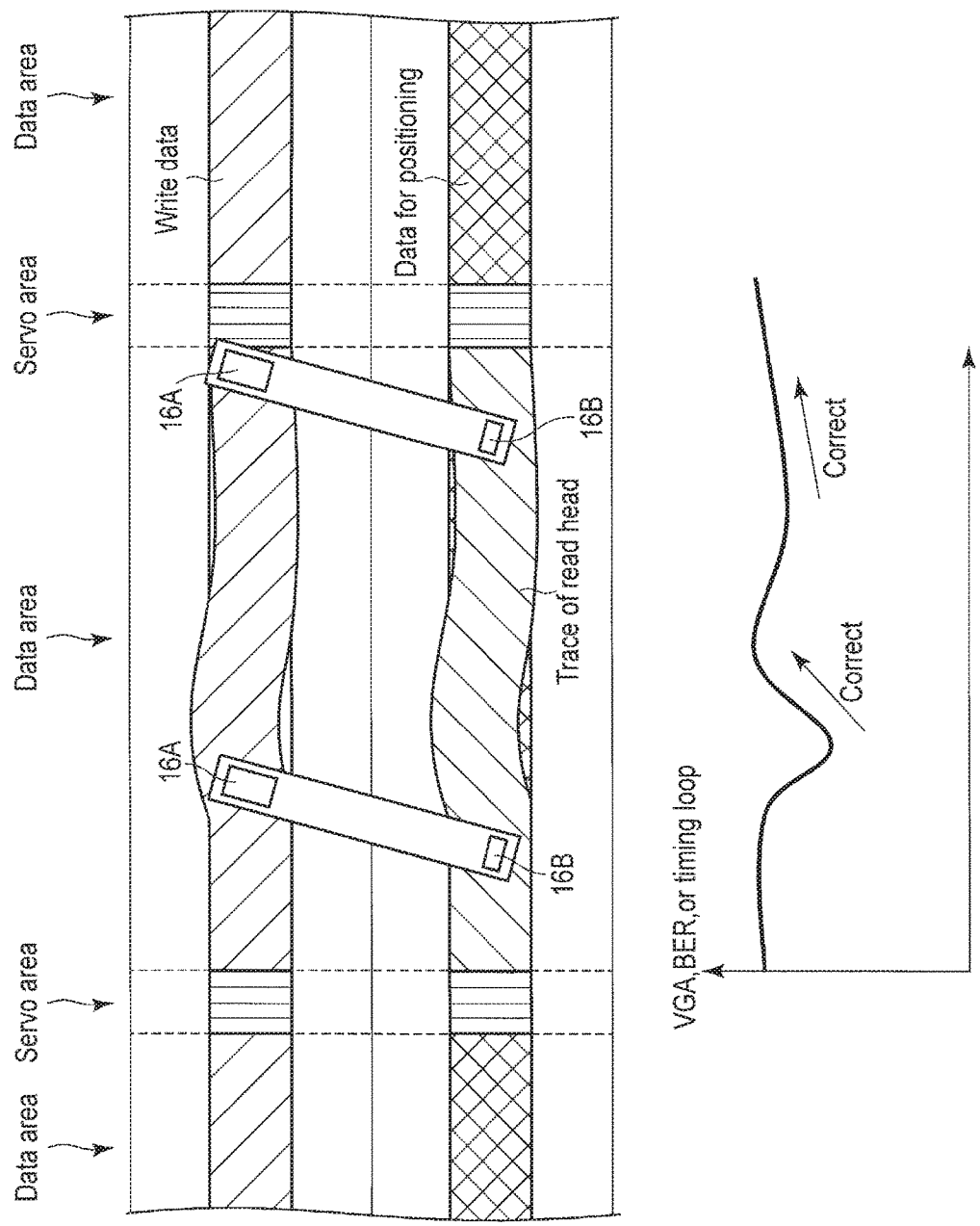
FIG. 7A is an exemplary illustration showing a trace of the head in a case where the head displacement correction is executed, in the embodiment.
FIG. 7B is an exemplary graph showing variation of the bit error rate, etc., in a tracking state shown in FIG. 7A.

FIG. 7A shows traces of the heads 16A and 16B in a case where the head displacement correction of the present embodiment is executed. When the heads 16A and 16B are located at the track center in the servo area and then the read head 16B is displaced from the track center during the data write such that the index such as the VGA, bit error rate, or timing loop is greatly reduced as shown in FIG. 7B and the difference between the reference value and the measured value becomes greater than or equal to the threshold value, the correcting operations following block 114 shown in FIG. 5 are executed and the positions of the heads 16A and 16B return to the track center. FIG. 7A and FIG. 7B shows an example in which, after detecting the head displacement, the heads 16A and 16B return too much and converge to the track center while wobbling before and after the track center.

As explained above, when the data is written to the disk, the servo data and the RRO correction data are read and, based on the data, the read head 16B is positioned and then the write head 16A is positioned. At the data write, since the heads 16A and 16B are displaced from the track center and the data is overwritten to an adjacent track such that the data written to the adjacent track is erased, the track interval is set to be longer than a theoretical value in prior art. For this reason, the track density cannot be increased and the areal recording density cannot be increased, either. According to the embodiment, however, while the write head 16A is located at the target track, a positional relationship of heads enabling the read head 16B to read the data from a track adjacent to the target track or the track remote by several tracks is implemented in a track area. In the track area the index indicating the displacement of the heads 16A and 16B can be obtained based on the output of the read head, and the displacement of the heads 16A and 16B can be corrected based on the index during the write. Therefore, even if the track density is increased in the track area, risk of erasing the data in the adjacent track does not occur and the areal recording density can be increased. In addition, since the displacement of the heads 16A and 16B can be corrected during the write, a number of servo areas are not required and, in the track area, the number of servo areas can be reduced and the areal recording density can be increased.

As explained in relation to block 108 of FIG. 5, displacement correction of the embodiment is not considered applicable to the entire area in the radial direction of the disk, and is limited to the specific track area where the MR offset is equal to the track interval or an integer multiple of the track interval. As more tracks or more areas are included in the specific track area, the displacement correction of the embodiment can be executed in more cases. The number of tracks included in the specific track area increases as the skew angle θ becomes smaller. The skew angle θ becomes smaller as the arm 18 is longer. For this reason, if the arm 18 is as long as possible, the number of tracks included in the specific track area is increased and the possibility of applying the displacement correction of the embodiment becomes higher.

Furthermore, if a plurality of read heads are mounted on the arm 18, the displacement correction of the embodiment can be executed in more cases since the possibility of locating either read head at the track center while writing the data at a certain track by the write head 16A becomes higher.

Alternatively, if a plurality of read heads are located at different positions on the arm, the possibility of applying the displacement correction of the embodiment becomes higher since options of the tracks where both the write and the read can be executed are increased. If two read heads 16B1 and 16B2 are mounted on the arm 18, a trace of the read head 16B2 does not pass through the track center while a trace of the read head 16B1 passes through the track center, at the skew angle of the arm shown in FIG. 8A. At the skew angle of the arm shown in FIG. 8B, the trace of the read head 16B1 does not pass through the track center while the trace of the read head 16B2 passes through the track center. For this reason, the displacement correction of the embodiment can be applied within a wide range of the skew angle.

A two-stage arm shown in FIG. 9 including a suspension-driven second-stage arm having a higher resonant frequency at the distal end of a VCM-driven conventional arm in order to flat a frequency response of the arm up to a high frequency range, has been recently put into practical use. The number of tacks included in the specific track area can also be increased by the two-stage arm. The two-stage arm includes a first arm 18-B which holds the head 16 and a second arm 18-A which holds the first arm. The second arm 18-A is driven to rotate by the voice coil motor 20. The first arm 18-B is attached to the second arm 18-A so as to be freely rotatable. Two piezoelectric elements are provided at a connection portion of the first arm 18-B and the second arm 18-A. When a voltage is applied to the piezoelectric elements, the piezoelectric elements are expanded and contracted in opposite phase, and the first arm 18-B is rotated about the second arm 18-A.

Second Embodiment

The above explanations are made based on the premise that the servo data is written at a predetermined track pitch or can be corrected by the RRO data even if the track pitch of the servo data is displaced. At the write of the servo data, however, the track pitch is often displaced due to eccentricity, etc., of the disk. If heads 16A and 16B are displaced from the track center at the data read, the output of the read head 16B or the bit error rate, the frequency tracking characteristics, etc., which are the signal processing results, are deteriorated as explained above. When the deterioration occurs constantly, the track pitch of the servo data is considered to be displaced. In a case where the track pitch of the servo data is narrower than a general track pitch as shown in FIG. 10A, if the read head 16B is positioned to write the data, based on the servo data, the write head 16A is displaced toward an outer peripheral side (i.e., an upper side in FIG. 10A) from a target track. If the read is executed while writing in this state, the read head 16B is also displaced toward the outer peripheral side, and an index such as VGA, the bit error rate or the timing loop assumes a small value as shown in FIG. 10B. If the small value continues for more than a specific period, the servo track pitch is considered to be displaced.

FIG. 11 is a typical flowchart showing a flow of processing of the main controller 26 of the second embodiment.

In block 202, the main controller 26 looks for the servo area. If the main controller 26 finds the servo area, the main controller 26 reads the servo data and positions the write head 16A at a target track, based on the read data, in block 204. In block 206, a read/write channel 30 starts writing the write data to the data area of the target track and reads the data by the read head 16B.

In block 208, the main controller 26 determines whether the output of the read head 16B or the signal processing result, for example, the bit error rate is less than a threshold value or not. If the bit error rate is not less than the threshold value, the track pitch of the servo track is considered proper as shown in FIG. 7A, unlike FIG. 10A, and the processing advances to the determination in block 108 in the flowchart of FIG. 5 whether the target track is present within the specific track area or not.

If the bit error rate is less than a threshold value, the track pitch of the servo track is considered narrow or wide as shown in FIG. 10A and, in block 210, the main controller 26 determines whether a specific period has elapsed or not. If the specific period has not elapsed, the processing returns to block 208 and the comparison with the threshold value continues. If the specific period has elapsed, the main controller 26 stops the write in block 212 since the track pitch of the servo track may be narrow or wide as shown in FIG. 10A. After that, the processing advances to the determination in block 108 in the flowchart of FIG. 5 whether the target track is present within the specific track area or not.

According to the second embodiment, even if the track pitch of the servo data is displaced, the displacement state of the track pitch of the servo data can be detected based on the output of the read head 16B. If the displacement state is detected, the write head 16A can be positioned at a target track by the same processing as the first embodiment. For this reason, even if the track pitch is made narrower, data of the adjacent track is not erased by overwriting, the track density can be increased and the areal recording density can be increased.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A hard disk drive, comprising:
    a disk comprising a plurality of data areas, and a plurality of servo areas between the plurality of data areas;
    an arm holding a write head and a plurality of read heads; and
    a positioning module which positions the plurality of read heads or the write head by rotating the arm,
    wherein the positioning module positions the write head at a first track by positioning the plurality of read heads, positions any one of the plurality of read heads at a second track, and adjusts a position of the plurality of read heads or the write head, based on an output of any one of the plurality of read heads located at the second track and located in a data area between two servo areas adjacent in a peripheral direction, of the plurality of servo areas.

2. The hard disk drive of claim 1, wherein
    the positioning module calculates a bit error rate of read data from the plurality of read heads or a frequency characteristic of a read signal from the plurality of read heads, and adjusts the position of the plurality of read heads or the write head, based on the bit error or the frequency characteristic.

3. The hard disk drive of claim 1, further comprising a variable gain amplifier which amplifies a read signal from the plurality of read heads,
    wherein the positioning module adjusts the position of the plurality of read heads or the write head, based on a gain of the variable gain amplifier.

4. The hard disk drive of claim 1, wherein
    the disk comprises a plurality of concentric tracks, and
    the positioning module adjusts the position of the plurality of read heads or the write head, based on the output of the plurality of read heads, when same data as data of a track at which the write head is located or data of a track different from the track at which the write head is located is present on a track at which the plurality of read heads are located and the data is readable.

5. The hard disk drive of claim 1, wherein
    the disk comprises a plurality of concentric tracks, and
    a track interval between the plurality of tracks, in a track area including the data area used for adjustment of the positioning module, is shorter than a track interval in the other track area.

6. The hard disk drive of claim 1, wherein
    the disk comprises a plurality of concentric tracks, and
    a number of servo areas per track in a track area including the data area used for adjustment of the positioning module is smaller than a number of servo areas in the other track area.

7. The hard disk drive of claim 1, wherein
    the arm comprises a two-stage arm comprising a first arm which holds the write head and the plurality of read heads and a second arm which holds the first arm,
    the second arm is driven to be freely rotatable, and
    the first arm is driven to be freely rotatable to the second arm.

8. The hard disk drive of claim 1, wherein
    when the output of the plurality of read heads or a value of a signal processing result of the output of the plurality of read heads is smaller than or equal to a threshold value for a specific period or more, the positioning module stops write and adjusts the position of the plurality of read heads or the write head, based on the output of the read head.

9. A head positioning method of a hard disk drive, the hard disk drive, comprising:
    a disk comprising a plurality of data areas, and a plurality of servo areas between the plurality of data areas;
    an arm holding a write head and a plurality of read heads; and
    a positioning module which positions the plurality of read heads or the write head by rotating the arm, the method comprising:
    positioning the write head at a first track by positioning the plurality of read heads;
    positioning any one of the plurality of read heads at a second track; and
    adjusting a position of the plurality of read heads or the write head, based on an output of any one of the plurality of read heads located at the second track and located in a data area between two servo areas adjacent in a peripheral direction, of the plurality of servo areas.

10. The head positioning method of claim 9, wherein the adjusting comprises:
    calculating a bit error rate of read data from the plurality of read heads or a frequency characteristic of a read signal from the plurality of read heads; and
    adjusting the position of the plurality of read heads or the write head, based on the bit error or the frequency characteristic.

11. The head positioning method of claim 9, wherein the hard disk drive further comprises a variable gain amplifier which amplifies a read signal from the plurality of read heads,
    wherein the adjusting comprises adjusting the position of the plurality of read heads or the write head, based on a gain of the variable gain amplifier.

12. The head positioning method of claim 9, wherein
the disk comprises a plurality of concentric tracks, and wherein
the adjusting comprises adjusting the position of the plurality of read heads or the write head, based on the output of the plurality of read heads, when same data as data of a track at which the write head is located or data of a track different from the track at which the write head is located is present on a track at which the plurality of read heads is located and the data is readable.

13. The head positioning method of claim 9, wherein
the disk comprises a plurality of concentric tracks, and
a track interval between the plurality of tracks, in a track area including the data area used for the adjusting, is shorter than a track interval in the other track area.

14. The head positioning method of claim 9, wherein
the disk comprises a plurality of concentric tracks, and
a number of servo areas per track in a track area including the data area used for the adjusting is smaller than a number of servo areas in the other track area.

15. The head positioning method of claim 9, wherein
the arm comprises a two-stage arm comprising a first arm which holds the write head and the plurality of read heads and a second arm which holds the first arm,
the second arm is driven to be freely rotatable, and
the first arm is driven to be freely rotatable to the second arm.

16. The head positioning method of claim 9, further comprising:
when the output of the plurality of read heads or a value of a signal processing result of the output of the plurality of read heads is smaller than or equal to a threshold value for a specific period or more, stopping write and adjusting the position of the plurality of read heads or the write head, based on the output of the plurality of read heads.

* * * * *